United States Patent [19]

Rolke et al.

[11] Patent Number: 4,483,772
[45] Date of Patent: Nov. 20, 1984

[54] PROCESS FOR TREATING AQUEOUS EFFLUENTS

[75] Inventors: Dietrich Rolke, Hofheim; Hans Hitzel, Dietzenbach, both of Fed. Rep. of Germany; Andries Brink, Sasolburg, South Africa

[73] Assignees: Metallgesellschaft AG, Frankfurt am Main, Fed. Rep. of Germany; Sasol One (Proprietary) Limited, Sasolburg, South Africa

[21] Appl. No.: 543,216

[22] Filed: Oct. 19, 1983

Related U.S. Application Data

[63] Continuation of Ser. No. 304,142, Sep. 21, 1981, abandoned.

[30] Foreign Application Priority Data

Sep. 25, 1980 [DE] Fed. Rep. of Germany ....... 3036123
Mar. 14, 1981 [DE] Fed. Rep. of Germany ....... 3109848

[51] Int. Cl.$^3$ ............................................. B01D 53/02
[52] U.S. Cl. ................................. 210/601; 210/683; 55/74; 48/210
[58] Field of Search ............... 210/601, 617, 618, 622, 210/623, 624, 631, 667, 683, 726, 669; 55/73, 74, 77, 79; 48/210

[56] References Cited

U.S. PATENT DOCUMENTS

| | | | |
|---|---|---|---|
| 3,156,644 | 11/1964 | Kunin | 210/664 |
| 3,297,404 | 1/1967 | Elliott et al. | 210/683 |
| 3,305,314 | 2/1967 | Freeland et al. | 210/683 |
| 3,408,289 | 10/1968 | Gustafson | 210/669 |
| 4,002,565 | 1/1977 | Farrell et al. | 48/210 |
| 4,104,159 | 8/1978 | Kanai | 210/667 |
| 4,137,158 | 1/1979 | Ishida et al. | 210/726 |
| 4,207,179 | 6/1980 | McCarthy et al. | 210/631 |
| 4,294,703 | 10/1981 | Wilms et al. | 210/631 |
| 4,321,143 | 3/1982 | Wilms et al. | 210/631 |

OTHER PUBLICATIONS

Handbook of Advanced Wastewater Treatment, 2nd Edition, Culp, Wisner & Culp, Van Nostrand Reinhold Company, 1978, pp. 348-353.
Chemical Engineering Progress, vol. 71, No. 6, Jun. 1975, pp. 99-104.

*Primary Examiner*—Richard V. Fisher
*Assistant Examiner*—Wanda L. Millard
*Attorney, Agent, or Firm*—Sprung, Horn, Kramer & Woods

[57] ABSTRACT

An improved process for the treatment of aqueous effluents containing strong anions such as sulphate, nitrate, chlorides and fluorides wherein the aqueous effluent is subjected to a biological purification process is described. According to the process, aqueous effluent such as those obtained by condensation of gases present in a coal gasification plant and containing these anions and others in a combined concentration of at least 2 mval/l and organic contaminants in a concentration of at least 1000 mg/l are subjected to the biological purification followed by separation of water from solids of the effluent. Thereafter, the water is subjected to anion exchange in an anion exchanger against hydrogen carbonate ions and at least part of the so-treated water is recycled to the aqueous effluent so as to be present therewith during the biological purification. By such a process the biological purification can be conducted at an optimum pH such as a pH in the range of 6 to 8. $CO_3/HCO_3$ ions contained in the water from the anion exchanger can be concentrated by passing the water through a cooling tower whereby a portion of the same is evaporated.

13 Claims, 2 Drawing Figures

PROCESS FOR TREATING AQUEOUS EFFLUENTS

This application is a continuation of application Ser. No. 304,142, filed 9-21-81, now abandoned.

BACKGROUND OF THE INVENTION

1. Field of the Invention

This invention relates to a process for treating aqueous effluent, especially of the type occurring in the form of gas condensates derived from coal gasification, in coal-based chemical plant and in coal liquefaction, having a content of the anions $SO_4^{--}$, $SCN^-$, $NO_3^-$, $Cl^-$ and $F^-$ totalling at least 2 mval/l and an organic load of at least 100 mg chemical oxygen demand/l. With the exception of the thiocyanate ions, the aforesaid anions are strong anions. The effluent usually also contains alkali ions.

2. Discussion of Prior Art

In the conversion of coal and similar fuels, e.g. by gasification, highly polluted waste waters are formed which contain components of the gasification product gas. Tars, oils, phenols, acid gases and ammonia are removed from the water containing condensates of the product gas in several coarse purification stages. Such a treatment is described in Chemical Engineering Progress, Vol. 71, No. 6, (1975), pages 99–104. In that process major proportions of the phenols are removed, for example by liquid/liquid extraction; ammonia and sulphides may be removed partly by steam stripping. However, the aqueous effluent coarsely purified in such manner still contains a number of unacceptable components, such as sulphate and thiocyanate, chlorine, fluorine and nitrate ions and also free ammonia and ammonium ions and organic impurities which militate against a direct discharge into drains or against reutilization, e.g. as cooling water.

It is an object of this invention to provide a process for treating these aqueous effluents in a simple manner and at reasonable cost, so as to enable their discharge or industrial use.

SUMMARY OF THE INVENTION

In accordance with the invention, this is attained in that the aqueous effluent is first purified biologically, optionally followed by a fine purification, strong anions contained in the effluent are exchanged against hydrogen carbonate ions in an ion exchange stage and at least a part of the so-treated water is recycled to the aqueous effluent so as to be present during the biological purification.

The treated water containing $CO_3/HCO_3'$ ions compensates for the cation deficiency and stabilizes the pH in the biological purification. Advantageously, this water contains at least 200 mg/l of $CO_3$ and $HCO_3$ ions in the form of alkali metal carbonate/hydrogen carbonate. The alkali metal ions are added to the system together with the effluent water.

In order to be available for the purposes of the biological purification, the recycled treated water is introduced before the biological purification or in any event not later than the early part of the nitrification stage or, in the absence of a nitrification stage, not later than the beginning of the biological purification stage.

The treatment in the biological purification zone, preferably involving nitrification and denitrification, in the absence of the aforesaid stabilization results in a cation deficiency. Causes thereof are in particular the absorption of nitrogen into the cellular matter of the micro-organisms and the conversion of ammonia into nitrite and nitrate by biological oxidation. This causes a pronounced drop of the pH value. One might consider counteracting this, e.g. by the addition of $Ca(OH)_2$ in order to avoid interference with the biological processes. However, major calcium concentrations would then interfere with the further use as cooling water and would have to be reduced at high cost. The addition of other foreign substances such as for example soda is also on the one hand expensive and, if the water is to be re-used, involves the problem that such substances must be removed again. In the process according to the invention, this is avoided by the anion exchange and the recycling of the treated water. The pH value in the biological purification can thus be maintained in the favorable range of approximately 6–8.

It is advantageous if the $CO_3/HCO_3$-containing water derived from the anion exchanger is first used as cooling water in a cooling tower. In this manner one can dispose of the effluent water to an extent which, depending on the evaporation may even be complete, thereby to attain corresponding savings in fresh water for cooling purposes. The evaporation which takes place in the cooling tower causes a rise in the concentration of $CO_3/HCO_3$ ions in the water which is then admixed to the aqueous effluent prior to the biological purification in amounts determined by the degree of concentration increase—preferably, however, to at least 400 mg/l. Simultaneously the content of alkali metal carbonate/hydrogen carbonate serves to avoid a drop in pH during the nitrification of ammonia in the cooling system.

Advantageously weakly basic anion exchangers having a good selectivity at least in respect of chloride and sulphate ions are used for exchanging the strong anions against hydrogen carbonate. Preferably a commercially available anion exchanger available from Rohm and Haas under the label IRA-68 can be used. Suitable ion exchangers have been described in U.S. Pat. No. 3,156,644 and in Ind. Eng. Chem., Process Res. & Dev. (1964), Vol. 3, page 404, the disclosures of which are hereby specifically incorporated herein by reference.

With the concentrations of strong anions between 2 and 10 mval/l as are generally likely to occur, a throughput of 100 to 600 volumes of water per volume of anion exchanger between successive regenerations may be expected, depending on the anion compositions and the desired average residual concentration in respect of fluoride and chloride. The regeneration of the anion exchanger is carried out for example with a 2 to 5% $NH_3$ solution (ammonium hydroxide solution). An ammonium salt solution of corresponding concentration is formed from which the ammonia may be recovered in the concentration required for the regeneration by the addition of hydrated lime, separation of the precipitation products and stripping with steam. After its regeneration with $NH_3$ solution (ammonium hydroxide), the anion exchanger is conditioned in a known manner with $CO_2$ solution, i.e. converted into its $HCO_3$ form and is then available for renewed charging.

Because the selectivity of conventional weakly basic anion exchanger for the exchange of fluoride ions against $HCO_3$ ions is not particularly favorable, it is advantageous in the event of substantial concentrations of fluoride ion in the effluent water, e.g. higher than 50 mg/l, to precipitate $CaF_2$ with an excess of $Ca(OH)_2$ prior to the biological purification. The treated water containing CO3/HCO3 ions is advantageously added after the CaF2 precipitation, so that calcium ions present as a result of use of lime hydrate in excess for the CaF2 precipitation are precipitated in the form of CaCO3 and can be separated off. In that manner the concentration of Ca ions which would interfere if present elsewhere, can be kept low.

As regards tolerable chloride ion concentrations, the limits thereof again depend to a substantial degree on the purpose to which the reclaimed water is to be put and on the materials with which it will come into contact. If the water is used in mild steel equipment, for example, comparatively high chloride concentrations are unlikely to produce intolerable corrosion problems. If the water on the other hand passes through stainless steel equipment, e.g. stainless steel heat exchangers, comparatively low chloride contents may result in stress corrosion phenomena. The critical concentration in the eluate is that which after a predetermined history of re-use of the water, e.g. a predetermined number of cycles of the water through a cooler system gives rise to a harmful concentration level, which in the case of chlorine ions is usually also of the order of 50 mg/l.

If the coarsely purified waste water intended for being subjected to the treatment according to the invention contains appreciably more ammonia in bound or free form than that which can be absorbed in the biological purification by the biomass there formed, the following procedure is recommended. At least a part of the treated water containing CO3/HCO3 ions is mixed with the effluent water rich in ammonia compounds, care being taken that the NH3 is driven off to an increasing extent. This driving off of NH3 preferably takes place in a stripping column in which the effluent water and the CO3/HCO3 containing water are mixed and where steam is blown therethrough. The ammonium salts react in the mixture approximately in the following manner (R representing an univalent anion):

$NH_4R + NaHCO_3 \rightarrow NaR + NH_3 + CO_2 + H_2O$

$2NH_4R + Na_2CO_3 \rightarrow 2NaR + 2NH_3 + CO_2 + H_2O.$

It is advantageous for a fine purification, preferably including a flocculation with sludge extraction and a filtration, to be carried out in between the biological treatment and the ion exchanger treatment. In order to reduce the loading of the anion exchanger stage by non-degraded organic substances, it may be advantageous to provide an adsorption stage with active charcoal and/or adsorption resin. The water introduced into the anion exchanger zone generally comprises a fluoride ion content per liter not exceeding 100 mg, preferably not exceeding 50 mg and a chemical oxygen demand (COD) of not more than 100 mg.

BRIEF DESCRIPTION OF DRAWINGS

The process is illustrated in the accompanying drawings in which.

DESCRIPTION OF SPECIFIC EMBODIMENTS

Figure 1:
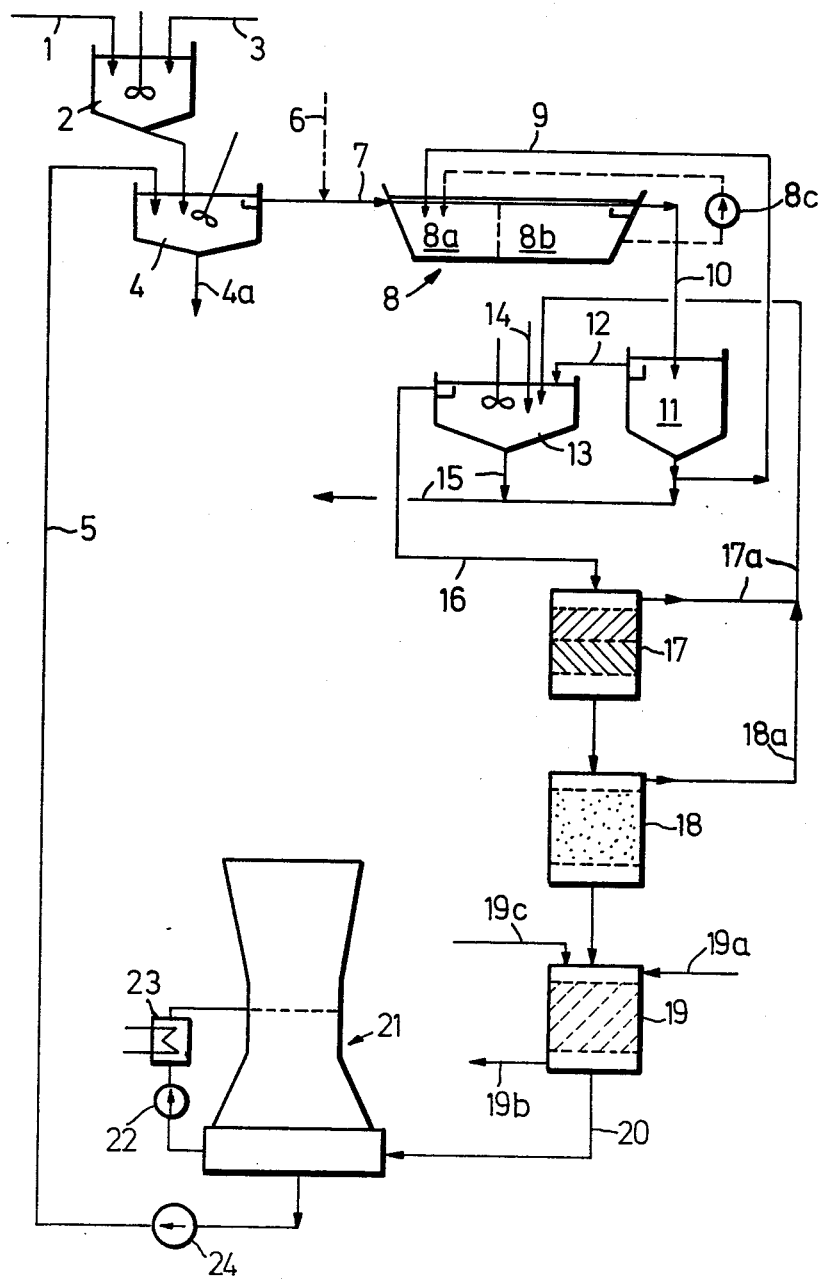
FIG. 1, the complete process diagram for an effluent water having only a moderate content of bound ammonia and FIG. 2, a pretreatment associated with the process according to FIG. 1 for an effluent water having a high content of bound ammonia.

According to FIG. 1, an effluent water which has already been coarsely purified in respect of tar, oil, phenols, acid gases and ammonia is fed through pipe 1 and introduced into a precipitation vessel 2 through which Ca(OH)2 is introduced through the pipe 3. As a result part of the fluoride contained in the effluent water is precipitated in the form of CaF2. The mixture is introduced into the precipitation vessel 4 jointly with treated water from the pipe 5 which has a CO3/HCO3 ion content of at least 400 mg/l. Precipitated calcium carbonate and calcium fluoride are withdrawn from the vessel 4 in the form of a sludge through pipe 4a. The precipitated sludge in pipe 4a contains about 40% of the fluoride ions present in the effluent water of pipe 1. It is advantageous to recycle a portion of the sludge of pipe 4a into the vessel 4 to serve as contact sludge, even though this is not indicated in the drawing.

The effluent water which leaves the vessel 4 through the pipe 7 is fed to the biological treatment stage 8. If desired, one can feed through the pipe 6 additional effluent water which is predominantly loaded with organic matter. Recycled sludge is emitted by the pipe 9. The feeding of air or even gas of higher oxygen content required for the treatment stage 8 is known per se and has been omitted from the drawing by way of simplification. The feed zone 8a of the biological treatment stage 8 is operated as a denitrification zone, while the further biological degradation of the organic substances and the nitrification takes place in the discharge region 8b. The internal recycling by way of the pipe indicated in broken lines and pump 8c serves to recycle nitrified effluent water from the zone 8b to the denitrification zone 8a. The biologically treated effluent water flows through the pipe 10 into a post-clarification vessel 11 from which sludge is withdrawn through the pipe line and is recycled.

The biologically purified effluent water enters a flocculating vessel 13 through the pipe 12. In that vessel a flocculant, optionally together with a flocculating aid is introduced through the pipe 14. The flocculated sludge is discharged through a pipe 15 jointly with the excess sludge of the vessel 11 from pipe 9. It is advantageous also in the context of the flocculation to operate with a sludge recycle even though this is not illustrated in the drawing. The effluent water in the pipe 16 then enters a filtration stage in a dual component filter 17 and an adsorptive treatment in an active carbon filter 18. The rinsing waters of these two filters 17 and 18 are fed to the flocculating vessel 13 through the pipes 17a and 18a.

The water from the active carbon filter 18 is then passed into an anion exchange plant 19. The water entering this plant has a fluoride ion content per liter of not more than 100 mg and a chemical oxygen demand of not more than 200 mg. In the exchanger plant 19 the strong anions, namely fluoride, chloride, nitrate and sulphate ions are exchanged against HCO3 ions. Once the anion exchanger is fully charged, it is treated with ammonia solution fed through the pipe 19a. The regenerating effluent thus resulting and which contains the exchanged strong anions is discharged through the pipe 19b. Ammonia is recovered from this regenerating effluent in a manner not illustrated. Before being re-used, the anion exchanger is conditioned with CO2 derived from pipe 19c.

The treated water passes through the pipe 20 into a cooling tower 21. It now has high grade cooling water quality, since it is now only contaminated with very small amounts of chloride and fluoride ion. In the cooling tower 21 the water is passed by means of the pump 22 through the cooling installation 23 and trickles down the tower. In the course thereof part of the water is evaporated and rises to emerge from the cooling tower 21. Part of the recycled cooling water, also known as blow down is returned by means of the pump 24 and the pipe 5 back to the effluent treatment.

Figure 2:
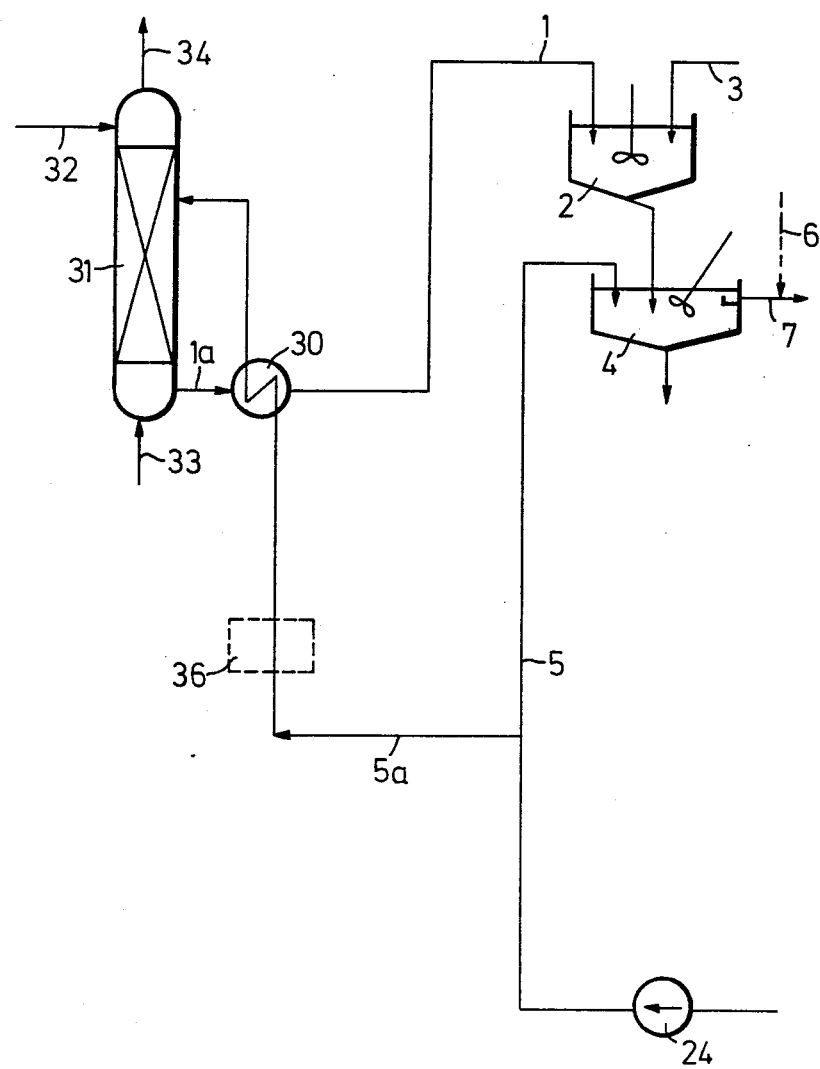

In the process modification according to FIG. 2, the treated water fed by the pump 24 (cf. FIG. 1) is partially side tracked by way of the pipe 5a and fed via a heat exchanger 30 to a stripping column 31. An effluent water which has been coarsely freed primarily of tar, oil and phenols is fed by way of the pipe 32 and is similarly applied onto the columns 31. The $CO_3$ and $HCO_3$ ions of the water from the pipe 5a enter into reaction in the column 31 with the bound ammonia of the effluent water of the pipe 32. Liberated $NH_3$ is driven off with steam from the pipe 33 and leaves the column through the pipe 34.

The discharge pipe 1a feeds an effluent water with a considerably reduced nitrogen content to the heat exchanger 30 where it is cooled. The thus resulting heating of the water introduced to the column through the pipe 5a results in a saving of steam fed through the pipe 33 for stripping. Motivated by a pump which is not illustrated, the cooled effluent water is first passed through the pipe 1 for further treatment in the precipitation vessel 2. Thus further treatment has already been described in the context of FIG. 1. Due to the lowered nitrogen content in the effluent water of pipe 1, the biological treatment 8 (cf FIG. 1) is simplified considerably; a nitrification/denitrification will be necessary there to a decreased extent only or not at all.

If desired, the entire water derived from the pump 24 may flow through the pipe 5a to the column 31, thus dispensing with the partial flow to vessel 4 illustrated in FIG. 2. The softening stage 36 which is illustrated in broken lines, may become necessary if harmful encrustations in the stripping column 31 are to be avoided.

EXAMPLE 1

In a pilot plant corresponding to FIG. 1, the data reflected to the following table were measured.

The feed flow in pipe 1 is a gas water from a coal pressure gasification obtained after pretreatment by liquid-liquid extraction and stripping with steam. The flow in pipe 6 is a reaction condensate obtained in a hydrocarbon synthesis, and the contamination of which is essentially confined to organic substances in the form of fatty acids ($C_2$-$C_5$). Both flows jointly represent the total effluent feed, totalling 160 l/h. The only materials to be treated outside the system are the concentrated sludges arising in the pipes 4a, 15 and 19b and salt-containing effluents in an amount of altogether 10 l/h. 150 l of water per hour are evaporated in the cooling tower 21.

In the water derived from the post-clarification 11 and discharged through pipe 12 having a residual chemical requirement of about 200 ppm, the chemical oxygen demand is reduced to 150 ppm (in pipe 16) by flocculation with 60 ppm bentonite and 5 ppm polyelectrolyte. The subsequent filtration in the dual component filter 17 and the treatment with active charcoal in the filter 18 brings about a further reduction of the chemical oxygen demand to about 50 ppm prior to entering the anion exchanger 19. The exchanger 19 is operated with IRA-68 supplied by Rohm and Haas. The $NO_2^-/NO_3^-$ which is necessarily present in the effluent of pipe 16 due to incomplete denitrification is similarly exchanged to a major extent. Finally, as a result of adsorptive processes in the anion exchanger 19 the chemical oxygen demand is even further reduced to 30 ppm. A partial nitrification of the $NH_3/NH_4^+$ takes place in the cooling system 21, 22, 23 from which result the concentrations of $NH_3/NH_4^+$ and $NO_2^-/NO_3^-$ measured in the water of pipe 5.

As regards treatment process chemicals, 1148 mval ammonia are fed per hour through the pipe 19a, these being recovered, however, for re-use to an extent of about 90%. 1148 mval/l $CO_2$ are fed through the pipe 19c, while 452 mval/l of $Ca(OH)_2$ are fed through the pipe 3.

TABLE 1

| Flow in pipe | 1 | 5 | 6 | 7 | 16 | 20 | 4a | 15 | 19b |
|---|---|---|---|---|---|---|---|---|---|
| Quantity (l/h) | 120 | 40 | 40 | 199 | 197 | 190 | 1 | 2 | 7 |
| $F^-$(mval/l) | 5.2 | 4.75 | 0 | 2.8 | 2.8 | 1.0 | 259 | 2.8 | 51.7 |
| $Cl^-$(mval/l) | 1.5 | 1.42 | — | 1.2 | 1.2 | 0.3 | 1.2 | 1.2 | 25.3 |
| $SO_4^{--}$(mval/l) | 1.0 | 1.0 | — | 1.4 | 1.4 | 0.2 | 1.4 | 1.4 | 33.7 |
| $SCN^-$(mval/l) | 1.0 | — | — | — | — | — | — | — | — |
| $NO_2^-/NO_3^-$(mval/l) | — | 4.2 | — | 0.85 | 1.2 | 0.3 | 0.85 | 1.2 | 25.3 |
| $Na^+/K^+$(mval/l) | 0.5 | 28.5 | — | 6.0 | 6.0 | 6.0 | 6.0 | 6.0 | 6.0 |
| $Ca^{++}/Mg^{++}$(mval/l) | 0.2 | 3.8 | — | 0.8 | 0.8 | 0.8 | 469 | 0.8 | 0.8 |
| $NH_3/NH_4^+$(mval/l) | 12.0 | 2.0 | — | 7.6 | 1.0 | 1.0 | 8.2 | 1.0 | 165 |
| $CO_3^{--}/HCO_3^-$(mval/l) | — | 22.8 | — | 4.6 | 1.2 | 6.0 | 210 | 1.2 | 1.2 |
| COD (mg/l) | 1500 | 145 | 12000 | 3317 | 150 | 30 | 3317 | — | 800 |

EXAMPLE 2

The effluent water used for example 1, a coarsely purified gas water derived from a coal pressure gasification is subjected to the treatment according to FIG. 2 and the further treatment according to FIG. 1. The effluent water in the pipe 32 is derived from a liquid-liquid extraction and is mixed in the column 31 with 20 l water from the pipe 5a per liter of effluent. 0.15 kg of steam serving as a stripping medium are fed per liter of effluent to the column through the pipe 33. The partial flow side tracked through pipe 5a contains 50% of the treated water supplied by the pump 24; water softening was dispensed with.

The discharge through pipe 1a has a temperature of about 100° C. and is cooled in the heat exchanger 30 to about 90° C. Further cooling not illustrated in FIG. 2 reduces the temperature of the effluent of pipe 1 to 25° C.

TABLE 2

| Flow in pipe | 32 | 1 | 5 | 6 |
|---|---|---|---|---|
| Quantity (l/h) | 120 | 140 | 20 | 40 |
| $F^-$(mval/l) | 5.14 | 5.14 | 4.75 | 0 |
| $Cl^-$(mval/l) | 1.49 | 1.49 | 1.42 | — |
| $SO_4^{--}$(mval/l) | 1.0 | 1.0 | 1.0 | — |
| $SCN^-$(mval/l) | 0.86 | 0.86 | — | — |

TABLE 2-continued

| | | | | |
|---|---|---|---|---|
| $NO_2^-/NO_3^-$ (mval/l) | — | 0.6 | 4.2 | — |
| $Na^+/K^+$ (mval/l) | 0.5 | 4.5 | 28.2 | — |
| $Ca^{++}/Mg^{++}$ (mval/l) | 0.2 | 0.7 | 3.8 | — |
| $NH_3/NH_4^+$ (mval/l) | 800 | 7.0 | 2.0 | — |
| $CO_3^{--}/HCO_3^-$ (mval/l) | — | — | 22.8 | — |
| COD (mg/l) | 1500 | 1300 | 145 | 6000 |

What is claimed is:

1. In a process for the treatment of an aqueous effluent obtained from the condensation of a gas derived from coal gasification, from a coal based chemical plant or from a coal liquification plant, said effluent containing ammonium ions and the anions $SO_4^{--}$, $SCN^-$, $NO_3^-$, $Cl^-$ and $F^-$ in a combined concentration of at least 2 mval per liter, an organic contamination corresponding to a chemical oxygen demand of at least 1000 mg/l, and alkalimetal ions, and which comprises the steps of:

(A) subjecting said effluent to a biological purification including nitrification at a pH value of 6 to 8 in the presence of an oxygen containing gas and a sludge in a biological treating zone, (B) the effluent from step A being subjected to clarification, flocculation and filtration, the effluent withdrawn from said filtration having a fluoride ion content per liter of not more than 100 mg and a chemical oxygen demand of not more than 200 mg and also containing the strong anions $F^-$, $Cl^-$, $NO_3^-$ and $SO_4^{--}$, (C) subjecting said effluent withdrawn from said filtration to an anion exchange in the presence of a weakly basic anion exchanger and exchanging a predominant part of said strong anions against $HCO_3$ ions, the effluent from said anion exchange being water containing $CO_3$ and $HCO_3$ ions, and (D) at least a part of said water, having a combined concentration of $CO_3$ and $HCO_3$ ions of at least 200 mg/l in the form of alkali carbonate and alkali hydrogen carbonate, being mixed with said effluent to be treated in said biological treating zone or upstream of said zone.

2. A process according to claim 1, wherein the aqueous effluent, prior to biological purification, is mixed with calcium hydroxide in a precipitation stage whereby to precipitate calcium fluoride which is separated from the so-treated aqueous effluent.

3. A process according to claim 2, wherein the aqueous effluent and the precipitation product are fed into a further precipitation stage containing calcium hydroxide in excess whereby to precipitate calcium ions in said aqueous effluent in the form of calcium carbonate which is separated off jointly with said calcium fluoride.

4. A process according to claim 3, wherein a partial stream of the water before step (A) is fed into a further precipitation stage.

5. A process according to claim 1, wherein the water obtained from the anion exchanger is wholly or partially mixed with aqueous effluent in a zone for driving off ammonia.

6. A process according to claim 5, wherein the water containing $CO_3/HCO_3$ ions and obtained from the anion exchanger is softened prior to being admixed with aqueous effluent in said zone for driving off ammonia.

7. A process according to claim 5, wherein said zone for driving off ammonia comprises a zone to which is introduced steam.

8. A process according to claim 1, wherein the water obtained from the anion exchanger is concentrated by evaporation to a combined $CO_3/HCO_3$ ion concentration of at least 400 mg/l and thereafter added to said aqueous effluent.

9. A process according to claim 8, wherein said concentration is effected in a cooling tower.

10. A process according to claim 1, wherein water derived from the anion exchanger and containing $CO_2/HCO_3'$ ions is used as cooling water prior to being recycled to the aqueous effluent.

11. A process according to claim 1, wherein the water obtained from the anion exchanger is fed to the biological purification stage which includes a nitrification stage at a point not later than the completion of the nitrification stage.

12. A process according to claim 1, wherein following biological purification, the so-treated water is subjected to fine purification comprising a flocculation stage with sludge withdrawal, filtration and/or an adsorbtive treatment.

13. In a process for the treatment of an aqueous effluent obtained from the condensation of a gas derived from coal gasification, from a coal based chemical plant or from a coal liquification plant, said effluent containing ammonium ions and the anions $SO_4^{--}$, $SCN^-$, $NO_3^-$, $Cl^-$ and $F^-$ in a combined concentration of at least 2 mval per liter, an organic contamination corresponding to a chemical oxygen demand of at least 1000 mg/l, and alkali metal ions, which consist essentially of:

(A) subjecting said effluent to a biological purification including nitrification at a pH value of 6 to 8 in the presence of an oxygen containing gas and a sludge in a biological treating zone, (B) the effluent from step A being subjected to clarification, flocculation and filtration, the effluent withdrawn from said filtration having a fluoride ion content per liter of not more than 100 mg and a chemical oxygen demand of not more than 200 mg and also containing the strong anions $F^-$, $Cl^-$, $NO_3^-$, and $SO_4^{--}$, (C) subjecting said effluent withdrawn from said filtration to an anion exchange in the presence of a weakly basic anion exchanger and exchanging a predominant part of said strong anions against $HCO_3$ ions, the effluent from said anion exchange being water containing $CO_3$ and $HCO_3$ ions, and (D) at least a part of said water having a combined concentration of $CO_3$ and $HCO_3$ ions of at least 200 mg/l in the form of alkali carbonate and alkali hydrogen carbonate, being mixed with said effluent to be treated in said biological treating zone or upstream to said zone.

* * * * *